United States Patent
Otsuka et al.

(10) Patent No.: US 11,020,996 B2
(45) Date of Patent: Jun. 1, 2021

(54) ABNORMALITY WARNING METHOD AND ABNORMALITY WARNING SYSTEM

(71) Applicant: SEIKO EPSON CORPORATION, Tokyo (JP)

(72) Inventors: Shuji Otsuka, Shiojiri (JP); Kazumi Aruga, Fujimi-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 59 days.

(21) Appl. No.: 16/243,707

(22) Filed: Jan. 9, 2019

(65) Prior Publication Data
US 2019/0210387 A1    Jul. 11, 2019

(30) Foreign Application Priority Data
Jan. 10, 2018 (JP) .............................. JP2018-001811

(51) Int. Cl.
*B41J 29/46* (2006.01)
*G08B 21/18* (2006.01)
*G06K 9/62* (2006.01)

(52) U.S. Cl.
CPC ............ *B41J 29/46* (2013.01); *G06K 9/6251* (2013.01); *G06K 9/6284* (2013.01); *G08B 21/182* (2013.01); *G08B 21/187* (2013.01)

(58) Field of Classification Search
None
See application file for complete search history.

(56) References Cited

U.S. PATENT DOCUMENTS

| 5,664,074 A | * | 9/1997 | Kageyama | G06K 15/00 358/1.14 |
| 6,510,907 B1 | * | 1/2003 | Blange | E21B 7/18 175/67 |
| 2001/0012031 A1 | * | 8/2001 | Miyake | B41J 2/5058 347/40 |

(Continued)

FOREIGN PATENT DOCUMENTS

| JP | 58-187739 U | 12/1983 |
| JP | 3594477 B2 | 12/2004 |

(Continued)

OTHER PUBLICATIONS

Extended European Search Report issued in EP Application No. 19150903.3, dated May 21, 2019 (9 pages).

(Continued)

*Primary Examiner* — Curtis J King
(74) *Attorney, Agent, or Firm* — Chip Law Group

(57) ABSTRACT

A method for warning an abnormality of a target object by using a self-organizing map prescribed by a plurality of nodes indicating a normal state of the target object includes acquiring detection data indicating a state of the target object, performing learning of the self-organizing map by using the detection data indicating a distance between a feature value and a node smaller than an abnormality threshold value predefined, storing the detection data indicating the distance larger than the abnormality threshold value in a storage unit as recorded data, and performing notification of the abnormality of the target object when the number of pieces of the recorded data stored in the storage unit reaches a predetermined number.

16 Claims, 10 Drawing Sheets

(56) References Cited

U.S. PATENT DOCUMENTS

| | | | |
|---|---|---|---|
| 2003/0076524 A1* | 4/2003 | Wanda | G06F 3/1205 358/1.14 |
| 2003/0151167 A1* | 8/2003 | Kritchman | B29C 64/112 264/401 |
| 2004/0130593 A1* | 7/2004 | Decorte | A23G 3/0097 347/40 |
| 2006/0038858 A1* | 2/2006 | Ishizaki | B41J 2/04581 347/68 |
| 2006/0167659 A1* | 7/2006 | Miyasaka | G01M 13/045 702/185 |
| 2007/0261073 A1* | 11/2007 | Blumenschein | H04N 21/2402 725/19 |
| 2007/0279446 A1* | 12/2007 | Ishizaki | B41J 2/04581 347/19 |
| 2009/0240641 A1 | 9/2009 | Hashimoto | |
| 2010/0123753 A1* | 5/2010 | Murahashi | B41J 2/17509 347/19 |
| 2011/0193903 A1* | 8/2011 | Kim | B41J 2/125 347/10 |
| 2012/0027436 A1* | 2/2012 | Maruyama | G03G 15/0291 399/31 |
| 2012/0081744 A1* | 4/2012 | Kadota | G06F 3/1288 358/1.15 |
| 2012/0268507 A1* | 10/2012 | Asami | B41J 2/17596 347/6 |
| 2014/0125722 A1* | 5/2014 | Otokita | B41J 2/0451 347/11 |
| 2014/0130576 A1* | 5/2014 | Blendinger | B05B 1/002 73/37 |
| 2014/0277910 A1 | 9/2014 | Suh et al. | |
| 2015/0191021 A1* | 7/2015 | Komatsu | B41J 2/14274 347/7 |
| 2015/0378650 A1* | 12/2015 | Tsuji | G06F 3/1229 358/1.15 |
| 2016/0059599 A1* | 3/2016 | Kyoso | B41J 2/2146 347/19 |
| 2016/0096159 A1* | 4/2016 | Black | C10G 11/18 239/302 |
| 2016/0167364 A1* | 6/2016 | Matsumoto | B41J 2/04551 347/9 |
| 2016/0356880 A1* | 12/2016 | Negussu | G01S 7/022 |
| 2017/0366709 A1* | 12/2017 | Horita | H04N 1/6005 |
| 2018/0001621 A1* | 1/2018 | Hosokawa | B41J 2/0451 |
| 2018/0126738 A1* | 5/2018 | Fukuda | B41J 2/0451 |
| 2018/0250938 A1* | 9/2018 | Kawakami | B41J 2/1433 |
| 2018/0272748 A1* | 9/2018 | Hasegawa | B41J 29/38 |
| 2019/0354326 A1* | 11/2019 | Kobayashi | H04N 1/32747 |

FOREIGN PATENT DOCUMENTS

| | | |
|---|---|---|
| JP | 2008-040684 A | 2/2008 |
| JP | 2008-097361 A | 4/2008 |
| JP | 4150761 B2 | 9/2008 |
| JP | 2009-210465 A | 9/2009 |
| JP | 2011-107093 A | 6/2011 |
| JP | 2013-101567 A | 5/2013 |
| JP | 2014-177273 A | 9/2014 |
| JP | 2017-035973 A | 2/2017 |
| WO | WO-2006/121455 A1 | 11/2006 |

OTHER PUBLICATIONS

Kohonen, "Self-Organizing Maps," Springer Series in Information Science, Springer, Berlin, Germany, Sep. 1, 1996, pp. 1-345 (195 pages).

* cited by examiner

ABNORMALITY WARNING METHOD AND ABNORMALITY WARNING SYSTEM

BACKGROUND

1. Technical Field

The invention relates to an abnormality warning method and an abnormality warning system.

2. Related Art

Various kinds of technology for detecting an abnormality of a target object such as a device and equipment by using a Self-Organizing Map (SOM) have been proposed (JP-A-2008-40684 described below, for example). When the technology of the self-organizing map is used, a normal state model in which mapping is performed to reflect low dimensional representation of multi-dimensional signal data representing signals detected to ascertain a state of a target object can be constructed easily. Thus, analysis and evaluation of such multi-dimensional detection data can be performed easily and appropriately, and whether a state of equipment is normal or abnormal can be determined.

In the technology disclosed in the above-described JP-A-2008-40684, when deviation between input data corresponding to the detection data and a neuron is large, it is often determined that there is an abnormality, and the input data concerned is deleted. Thus, there is a possibility of the target object being determined as having an abnormality even when the target object is in the normal state, and an input data having large deviation is acquired by accident for some reason. In addition, there is a possibility of the self-organizing map being formed to cause the input data not essentially abnormal to be often determined as abnormal. Accordingly, in the technology for warning an abnormality of a target object by using a self-organizing map, there is still room for improvement in terms of enhancing accuracy of the warning to cause the warning of the abnormality to be issued more appropriately without error.

SUMMARY

The invention has been made to address at least some of the above-described issues and can be realized as the following aspects.

[1] According to an aspect of the invention, a method for warning an abnormality of a target object by using a self-organizing map prescribed by a plurality of nodes indicating a normal state of the target object is provided. The method for warning an abnormality of a target object according to this aspect includes acquiring detection data indicating a state of the target object and acquiring a feature value from the detection data, performing learning of the self-organizing map by using at least a portion of the detection data indicating a distance between the feature value and a node closest to the feature value of the plurality of nodes smaller than an abnormality threshold value predefined, storing the detection data indicating the distance larger than the abnormality threshold value in a storage unit as recorded data, and performing notification of the abnormality of the target object when the number of pieces of the recorded data stored in the storage unit reaches a predetermined number.

According to the method of this aspect, the detection data having the feature value having a large distance from the node is temporarily accumulated, and when such detection data is repeatedly acquired, a warning of a possibility of abnormality occurrence in the target object is issued. As a result, the warning of the abnormality of the target object issued owing to an event having simply occurred by accident is suppressed.

[2] The method of the above-described aspect may further include generating the self-organizing map in advance by using the detection data obtained from the target object confirmed as being in a normal state.

According to the method of this aspect, since the self-organizing map is generated in advance as a reference appropriately representing the normal state of the target object, the accuracy of the warning of the abnormality can be enhanced more quickly.

[3] In the method of the above-described aspect, the abnormality threshold value is a first abnormality threshold value larger than a second abnormality threshold value predetermined, and the detection data indicating the distance smaller than the first abnormality threshold value and larger than the second abnormality threshold value may be discarded without being used for the learning of the self-organizing map.

According to the method of this aspect, since the detection data between the detection data indicating a sign of the abnormality in the target object and the normal detection data used for the learning of the self-organizing map is discarded, a distinction between an abnormality and a normal state can be made more clearly.

[4] The method of the above-described aspect may further include receiving an input from an operator of evaluation as to whether the abnormality notified is within a permissible range, and deleting the recorded data from the storage unit when the evaluation indicates that the abnormality is outside the permissible range.

According to the method of this aspect, discarding of the recorded data without being subjected to the evaluation by an operator is suppressed.

[5] The method of the above-described aspect may further include changing a value of the abnormality threshold value in accordance with the evaluation.

According to the method of this aspect, since the evaluation by an operator can be reflected in the selection of the detection data, the warning of the abnormality can be issued more appropriately.

[6] In the method of the above-described aspect, the recorded data may be stored in the storage unit for each of a plurality of ranks set in accordance with the distance, and the notification may be executed when the number of pieces of the recorded data in at least one of the plurality of ranks reaches or exceeds a notification threshold value set in advance for each of the plurality of ranks.

According to the method of this aspect, the warning is issued more appropriately in accordance with frequency of the abnormality occurrence indicated by the number of pieces of the recorded data for each of the ranks.

[7] The method of the above-described aspect may further include discarding the recorded data of the at least one of the plurality of ranks having prompted the notification of the abnormality, and causing the notification threshold value of the at least one of the plurality of ranks having prompted the notification of the abnormality to be lowered as compared to the notification threshold value obtained before the notification of the abnormality.

According to the method of this aspect, with respect to the rank in which the warning has already been issued, the warning of the abnormality occurrence is executed early.

[8] The method of the above-described aspect may further include receiving an input from an operator of evaluation as to whether the abnormality notified is within the permissible range, and performing the learning of the self-organizing map by using the recorded data having triggered the notification of the abnormality, when the evaluation is evaluation indicating that the abnormality is an abnormality falling within the permissible range.

According to the method of this aspect, owing to the detection data indicating that an operator has determined that the abnormality is within the permissible range, repeated the warning the abnormality is suppressed.

[9] In the method of the above-described aspect, the recorded data may be stored in the storage unit in association with the node closest to the feature value, and the notification may be executed when the number of pieces of the recorded data with respect to at least one of the plurality of nodes reaches or exceeds the notification threshold value set in advance for each of the plurality of nodes.

According to the method of this aspect, detection accuracy of the abnormality for each of the nodes can be enhanced.

[10] In the method of the above-described aspect, the detection data indicating states of a plurality of the target objects may be acquired by a single sensor.

According to the method of this aspect, detection of the abnormality with respect to the plurality of target objects can be performed efficiently.

[11] In the method of the above-described aspect, the self-organizing map may be generated for each of a plurality of the target objects.

According to the method of this aspect, detection accuracy of the abnormality for each of the plurality of target objects can be enhanced.

[12] In the method of the above-described aspect, the self-organizing map may be constructed by using information of the plurality of nodes stored in the storage unit in a non-volatile manner.

According to the method of this aspect, the learning of the self-organizing map can be continued for a long period of time.

[13] The method of the above-described aspect may further include reading out the information of the plurality of nodes from the storage unit after information regarding a history of maintenance implemented on the target object is input, and constructing the self-organizing map of a state prior to the implementation of the maintenance.

According to the method of this aspect, even after the maintenance, the self-organizing map including contents of the learning accumulated to date can be used continuously. As a result, a temporary drop in the detection accuracy of the abnormality caused by restarting the learning of the self-organizing map MP from an initial stage is suppressed.

[14] The method of the above-described aspect may further include initializing the information of the plurality of nodes in the storage unit and initializing the self-organizing map after information regarding a history of maintenance implemented on the target object is input.

According to the method of this aspect, after the maintenance is performed to cause the target object to return to the initial state obtained immediately after start of use, a drop in the detection accuracy of the abnormality caused by use of an inappropriate self-organizing map reflecting the state of the target object prior to the maintenance is suppressed.

[15] The method of the above-described aspect may further include performing the learning of the self-organizing map by using the detection data indicating a state of the target object obtained after the implementation of the maintenance.

According to the method of this aspect, a more appropriate self-organizing map suitable for the state of the target object obtained after the maintenance can be obtained.

[16] Another exemplary embodiment of the invention is provided as an abnormality warning system configured to issue a warning of an abnormality of a target object. The abnormality warning system of this aspect includes a sensor configured to output detection data indicating a current state of the target object, a storage unit configured to store information relating to a plurality of nodes prescribing a self-organizing map and indicating a normal state of the target object, and recorded data, a notification unit configured to perform notification of an abnormality of the target object, and a control unit configured to detect the abnormality in the target object and cause the notification unit to perform the notification of the abnormality by using the self-organizing map constructed by using the information relating to the plurality of nodes, and the detection data. The control unit performs learning of the self-organizing map by using a distance between a feature value acquired from the detection data and a node closest to the feature value of the plurality of nodes and, when the distance is smaller than an abnormality threshold value predefined, performs learning of the self-organizing map by using at least a portion of the detection data, stores the detection data in the storage unit as the recorded data when the distance is larger than the abnormality threshold value, and causes the notification unit to perform the notification of the abnormality when the number of pieces of the recorded data stored in the storage unit reaches a predetermined number.

According to the abnormality warning system of this aspect, the detection data having the feature value having a large distance from the node is temporarily accumulated, and when such detection data is repeatedly acquired, a warning of a possibility of abnormality occurrence in the target object is issued. As a result, the warning of the abnormality of the target object due to an event having simply occurred by accident is suppressed.

Not all of the plurality of components provided in each of the above-described aspects of the invention need necessarily be adopted, and to address some or all of the above-described issues, or to achieve some or all of effects described herein, it is possible to perform, as appropriate, change, deletion, replacement with other new components, or partial deletion of limited contents on some of the plurality of components. In addition, to address some or all of the above-described issues, or to achieve some or all of effects described herein, it is possible to combine some or all of the technical features provided in one of the above-described aspects of the invention with some or all of the technical features provided in another of the above-described aspects of the invention to form an independent aspect of the invention.

The invention can also be realized in various aspects other than the abnormality warning method and the abnormality warning system. For example, the invention can be realized in aspects such as a detection method and a detection device of an abnormality, a learning method of a self-organizing map, and an analysis method of a sensor signal. In addition, the invention can also be realized in aspects such as a computer program configured to realize such methods and a non-temporary recording medium storing the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Exemplary Embodiment

Figure 1:
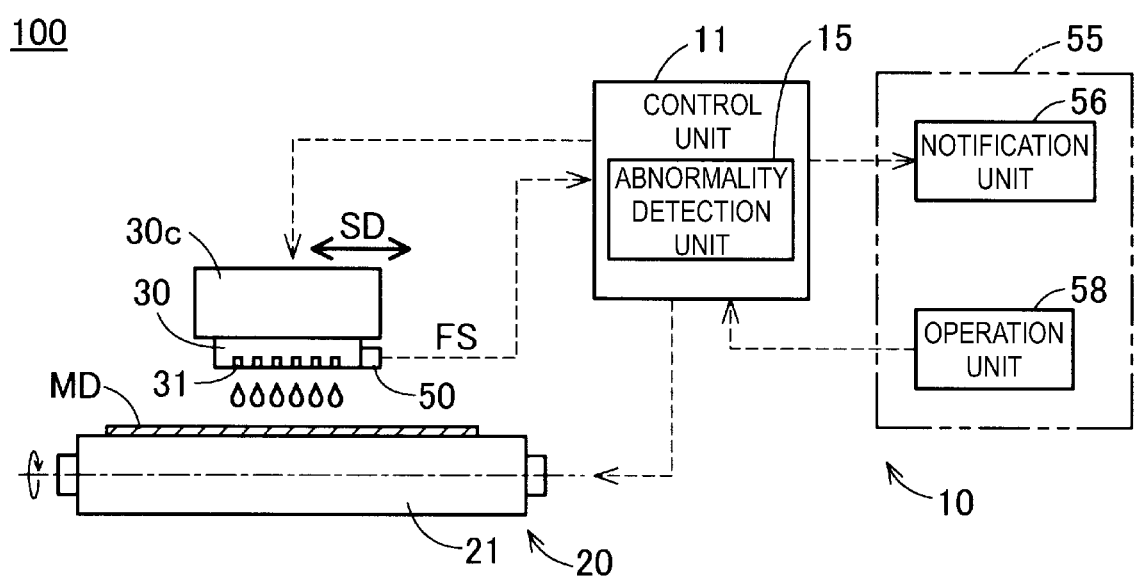
FIG. 1 is a schematic view illustrating a configuration of a printing apparatus.

FIG. 1 is a schematic view illustrating a configuration of a printing apparatus 100 on which an abnormality warning system 10 is mounted according to First Exemplary Embodiment. The printing apparatus 100 is an ink jet printer configured to discharge liquid ink onto a medium MD to form an image. In First Exemplary Embodiment, the medium MD is a printing sheet. The abnormality warning system 10 monitors a driving state of the printing apparatus 100, detects a sign of abnormality occurrence, and warns the sign of abnormality occurrence. In the following, a configuration regarding a printing function of the printing apparatus 100 will be described and subsequently, a configuration of the abnormality warning system 10 will be described.

The printing apparatus 100 includes a control unit 11, a conveyance unit 20, and a printing head 30. The control unit is configured as a microcomputer including a central processing unit (CPU) and a main storage device (RAM). The control unit 11 performs various functions as a result of the CPU causing various instructions and programs to be read into the RAM and to be executed.

The control unit 11 has a function to control print processing of the printing apparatus 100. The control unit 11 controls conveyance of the medium MD by the conveyance unit 20 and discharge of liquid ink droplets by the printing head 30, in accordance with print data input from the outside, or an operation by a user received via an operation unit (not illustrated) of the printing apparatus 100. In the exemplary embodiment, the control unit 11 also functions as an abnormality detection unit 15 configured to execute abnormality detection processing in the abnormality warning system 10 (to be described later).

The conveyance unit 20 includes a conveyance roller 21 configured to rotate by a drive motor (not illustrated). Under the control of the control unit 11, the conveyance unit 20 causes the conveyance roller 21 to rotate and conveys the medium MD on the conveyance roller 21.

The printing head 30 is mounted on a bottom surface of a carriage 30c configured to reciprocate under the control of the control unit 11 above a conveyance path of the medium MD in a main scanning direction SD intersecting a sub scanning direction being a conveyance direction of the medium MD. The printing head 30 includes a plurality of nozzles 31, and under the control of the control unit 11, discharges the ink droplets from each of the nozzles 31 toward a print surface of the medium MD and records ink dots. The printing head 30 discharges the ink filling a pressure chamber from the nozzles 31 by a known method such as applying pressure to the ink in the pressure chamber by an actuator such as a piezoelectric element, for example.

When the abnormality warning system 10 detects the sign of the abnormality occurrence in the target object, the abnormality warning system 10 warns the abnormality in the target object concerned. Herein, the "warning of the abnormality" means notifying the sign of the abnormality occurrence. In First Exemplary Embodiment, the abnormality warning system 10 monitors the nozzles 31 of the printing head as target objects, and warns an ink discharge abnormality from the nozzles 31 to an operator of the printing apparatus 100. In addition to the above-described abnormality detection unit 15, the abnormality warning system 10 includes a sensor 50 and an interface unit 55.

The sensor 50 is attached to the printing head 30. The sensor 50 includes a sound sensor such as a microphone, for example. The sensor 50 desirably has a sensitivity capable of detecting a ultrasonic frequency band. The sensor 50 is attached in a vicinity of the nozzles 31 to enable detection of ink discharge sound of the nozzles 31.

Here, the "ink discharge sound" means sound in general produced at the time of discharging the ink from the nozzles 31. As a result, the "ink discharge sound" includes sound produced by movement of the ink, driving sound of the actuator, and vibration sound of the printing head 30 or a housing of the carriage 30c, for example.

The sensor 50 outputs, to the abnormality detection unit 15, a frequency signal FS indicating the ink discharge sound. The sensor 50 collectively detects the ink discharge sound produced at the time of discharging the ink from each of the plurality of nozzles 31. For example, in one cycle of a discharge operation, when the printing head 30 performs the discharge operation in four types of discharge modes driven by four different types of driving signals, the frequency signal FS output by the sensor 50 with respect to the one cycle of the discharge operation is expressed by Equation (1) below.

$$FS = N_1 * S_1 + N_2 * S_2 + N_3 * S_3 + N_4 * S_4 \qquad (1)$$

$N_n$ (n=1 to 4) . . . . The number of nozzles performing the discharge operation in a discharge mode n $S_n$ (n=1 to 4) . . . . A sound wave produced by one cycle of the operation in the discharge mode n Note that when the discharge mode of n=4 is an operation mode in which no ink is discharged, the term $N_4 * S_4$ is 0.

The interface unit 55 includes a notification unit 56 and an operation unit 58. The notification unit 56 notifies an operator of information relating to the abnormality of the target object under the control of the control unit 11. The notification unit 56 may include a display unit such as a liquid crystal display configured to visually notify an operator of the information. In addition, the notification unit 56 may include, for example, an audio output unit such as a speaker configured to notify an operator of the information by sound or a voice. The notification unit 56 may include both the display unit and the audio output unit. The operation unit 58 receives an operation from an operator, and outputs the operation to the control unit 11. The operation unit 58 may include a button, or a touch panel configured to also function as the display unit of the notification unit 56, for example.

Figure 2:
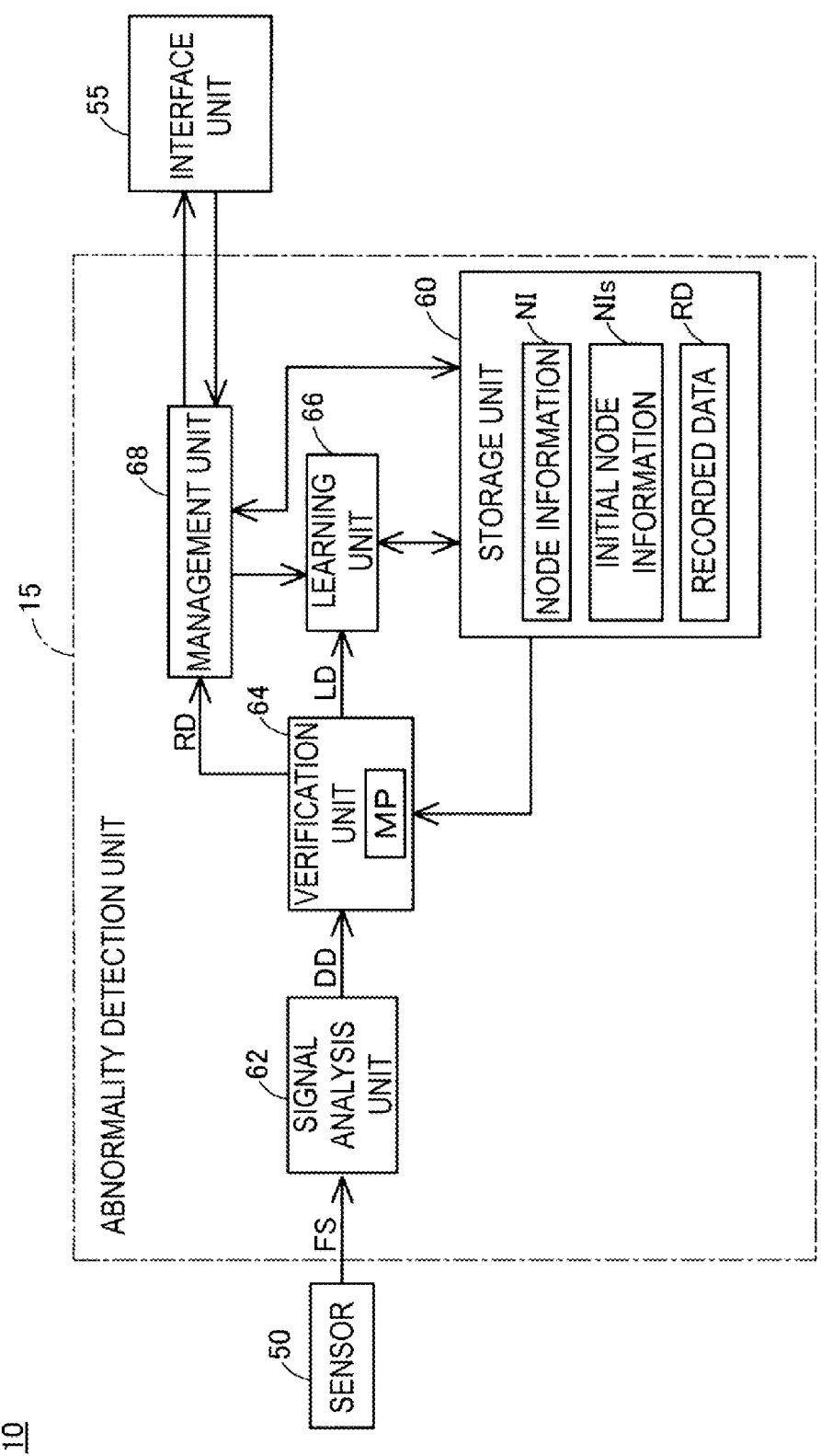
FIG. 2 is a schematic block diagram illustrating a configuration of an abnormality detection unit.

FIG. 2 is a schematic block diagram illustrating a configuration of the abnormality detection unit 15. The abnormality detection unit 15 includes a storage unit 60, a signal analysis unit 62, a verification unit 64, a learning unit 66, and a management unit 68. The storage unit 60 includes a non-volatile storage device such as a hard disk device, for example. In the storage unit 60, node information NI, initial node information NIs, and recorded data RD are stored. The node information NI, the initial node information NIs, and the recorded data RD will be described later.

The signal analysis unit 62 acquires the frequency signal FS output by the sensor 50 and generates detection data DD. In the exemplary embodiment, the signal analysis unit 62 generates, for example, the detection data DD in which the frequency signal FS is three-dimensionally visualized on the basis of time, a frequency, and strength by using a Continuous Wavelet Transform (CWT), and outputs the detection data DD to the verification unit 64. Note that the signal analysis unit 62 may generate multi-dimensional (two dimensional or higher) detection data DD by a method other than the CWT.

In synchronization with timing at which the driving signal causing the nozzles 31 to discharge the ink is input from the control unit 11 to the printing head 30, the signal analysis unit 62 acquires, from the sensor 50, the frequency signal FS of a cycle predetermined in accordance with the driving signal. The frequency signal FS is acquired for each cycle of the discharge operation of the printing head 30. As described above, in First Exemplary Embodiment, the frequency signal FS indicates the ink discharge sound produced at the time of discharging the ink from each of the plurality of nozzles 31. Namely, in First Exemplary Embodiment, the detection data DD indicating states of a plurality of the target objects can be understood as being acquired by the single sensor 50.

The verification unit 64 constructs the self-organizing map MP by using the node information NI of the storage unit 60. Then, the verification unit 64 executes verification processing of using the self-organizing map MP constructed to verify whether the detection data DD indicates the normal state of the target object, or indicates a sign of the abnormality occurrence in the target object (details to be described later). The verification unit 64 outputs the detection data determined as indicating the normal state of the target object to the learning unit 66 as learning data LD. On the other hand, the verification unit 64 outputs the detection data DD indicating a state different from the normal state of the target object to the management unit 68 as the recorded data RD.

The learning unit 66 uses the learning data LD to update the node information NI (to be described later) stored in the storage unit 60. The node information NI is information relating to a node prescribing the self-organizing map MP. The initial node information NIs stored in the storage unit 60 together with the node information NI is initial data of the node information NI obtained before the learning by the learning unit 66 is performed, and is information prescribing the self-organizing map MP having an initial state. In the exemplary embodiment, the initial node information NIs is prepared in advance prior to factory shipment on the basis of the detection data DD obtained in the printing apparatus 100 serving as a reference confirmed as being in the normal state. Namely, in the method for issuing a warning of an abnormality in a target object realized in the abnormality warning system 10 of the exemplary embodiment, it is understood that the method includes a step of generating the self-organizing map MP in advance by using the detection data DD obtained from the target object confirmed as being in the normal state.

The management unit 86 manages the recorded data RD. The management unit 68 stores the recorded data RD received from the verification unit 64 in the storage unit 60. In First Exemplary Embodiment, a database used for classifying and managing the recorded data RD in the storage unit 60 is constructed by the management unit 68. On the basis of a recording status of the recorded data RD in the storage unit 60, the management unit 68 causes the interface unit 55 to execute the warning notifying an operator of a possibility of the abnormality occurrence in the target object (to be described later).

Additionally, the management unit 68 executes processing of receiving evaluation of the recorded data RD from an operator via the interface unit 55 (to be described later). In addition, the management unit 68 acquires information relating to maintenance of the target object from an operator via the interface unit 55, and executes processing corresponding to the acquired information relating to the maintenance (to be described later).

Figure 3:
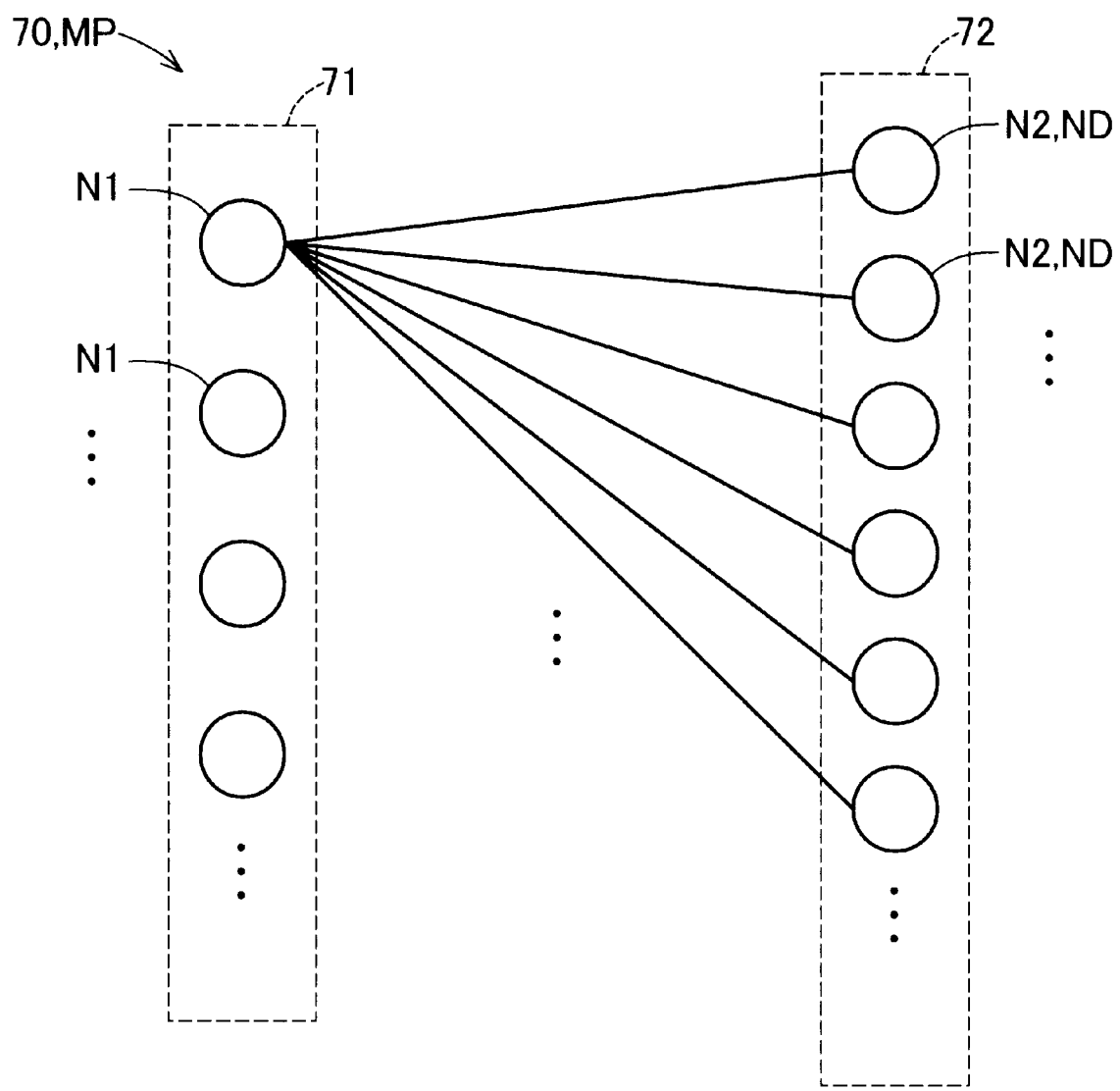
FIG. 3 is a schematic diagram illustrating a configuration of a neural network in a verification unit.

The self-organizing map MP constructed in the abnormality warning system 10, and the verification processing performed by the verification unit 64 and using the self-organizing map MP will be described with reference to FIG. 3 and FIG. 4. FIG. 3 is a schematic diagram illustrating a competitive learning-type neural network 70 (hereinafter also simply referred to as a "neural network 70") configured to construct the self-organizing map MP without a teacher in the verification unit 64. The neural network 70 includes two layers of an input layer 71 and an output layer 72.

The input layer 71 includes the number of neurons N1 equal to n (n is any natural number of 2 or greater), and the output layer 72 includes the number of neurons N2 equal to m (m is any natural number of 2 or greater). Each of the neurons N1 of the input layer 71 is connected to each of the neurons N2 of the output layer 72 in a one-to-many relationship. Each of the neurons N2 of the output layer 72 indicates a reference point of the self-organizing map MP and corresponds to a node ND prescribing the self-organizing map MP. In the exemplary embodiment, each of the nodes ND indicates a reference for the normal state of the target object on the self-organizing map MP.

A degree of connection indicating a degree of relevancy between the neurons N1 and N2, is set between each of the neurons N1 of the input layer 71 and each of the neurons N2 of the output layer 72. Namely, it can be said that, in each of the nodes ND, a weight vector corresponding to a distance between each of the nodes ND and each of the neurons N1 of the input layer 71 is set. The weight vector is variable, updated by the learning unit 66, and stored in the storage unit 60 as the node information N1 described above in a non-volatile manner. As a result of the weight vector of each of the nodes ND being updated repeatedly, the accuracy of the self-organizing map MP is enhanced as the normal state model in which the target object is in the normal state.

Figure 4:
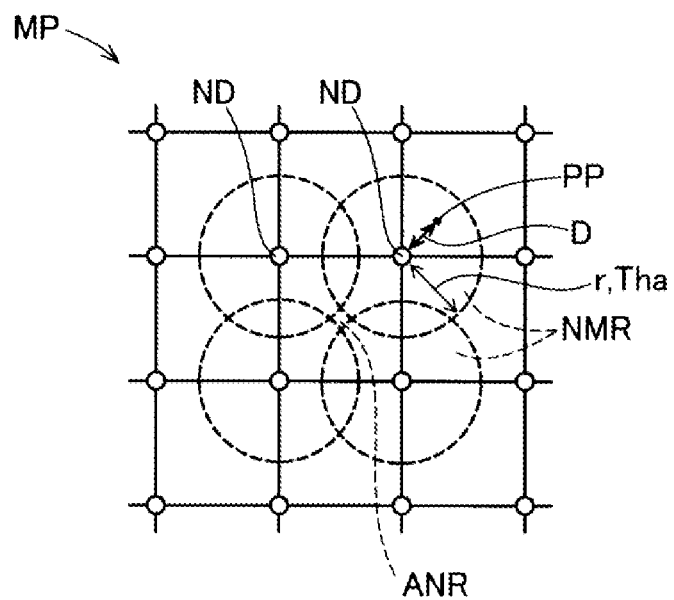
FIG. 4 is a schematic diagram illustrating a concept of a self-organizing map constructed in the verification unit.

FIG. 4 is a schematic diagram illustrating a concept of the self-organizing map MP constructed in the abnormality warning system 10. In FIG. 4, as a matter of convenience, a normalized distance between the nodes ND prescribed by the weight vector is illustrated. FIG. 4 illustrates a point illustrating an example of a position PP at which the detection data DD is mapped on the self-organizing map MP. On the self-organizing map MP, a region within a radius r from each of the nodes ND is a normal region NMR in which the state of the target object is determined as normal. Then, a region positioned outside the region within the radius r from each of the nodes ND is an abnormal region ANR in which it is determined that the target object is in a state different from the normal state and that there is a possibility of abnormality occurrence in the target object. In the example in FIG. 4, the abnormal region ANR is illustrated as a region surrounded by four normal regions NMR each including the node ND at the center.

The verification processing by the verification unit 64 is executed as follows. The verification unit 64 acquires a feature value of the detection data DD input from the signal analysis unit 62 (FIG. 2) and inputs the feature value acquired to the input layer 71 (FIG. 3). Then, a neuron N2 having a minimum Euclidean distance between the weight vector and the detection data DD concerned fires. Then, the detection data DD including the feature value concerned is mapped on the self-organizing map MP (at the position PP in FIG. 4) by using the node ND corresponding to the neuron N2 having fired as a reference.

The verification unit 64 calculates a distance D between the position PP at which the detection data DD is mapped on the self-organizing map MP, and the node ND (the neuron N2 having fired) closest to the position PP at which the detection data DD is mapped. Then, the verification unit 64 compares the distance D from the node ND closest with a first abnormality threshold value Tha being an abnormality threshold value set for each of the nodes ND. The first abnormality threshold value Tha is a value corresponding to the radius r in FIG. 4. When the distance D is equal to or less than the first abnormality threshold value Tha, the verification unit 64 determines that the detection data DD belongs to the normal region NMR, and when the distance D is larger than the first abnormality threshold value Tha, the verification unit 64 determines that the detection data DD belongs to the abnormal region ANR.

Figure 5:
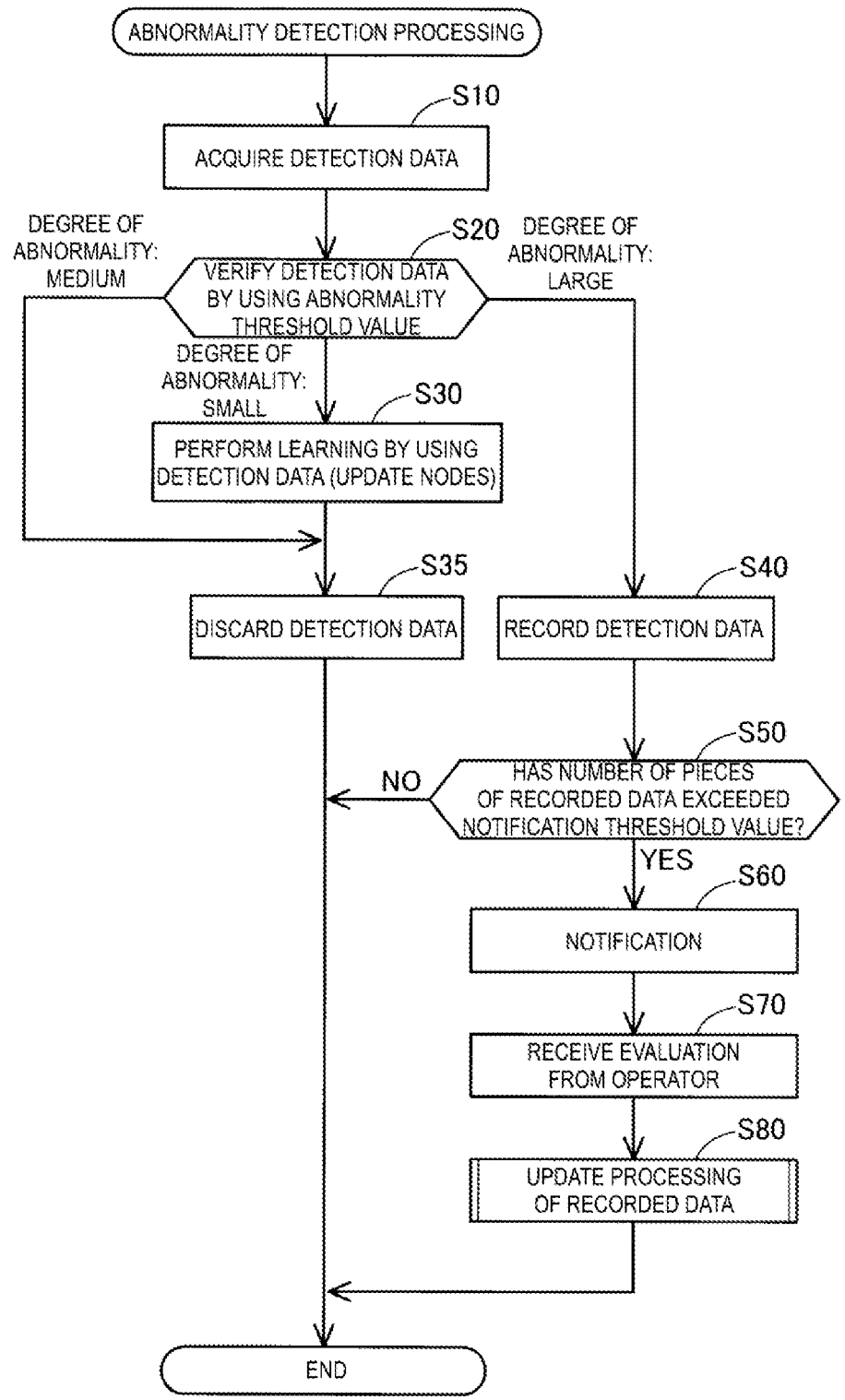
FIG. 5 is an explanatory diagram illustrating a flow of abnormality detection processing.

FIG. 5 is an explanatory diagram illustrating a flow of the abnormality detection processing executed by the abnormality detection unit 15 in the abnormality warning system 10. In the printing apparatus 100, the abnormality warning system 10 repeatedly executes the abnormality detection processing each time the ink discharge operation is executed in the printing head 30. At step S10, the detection data DD is acquired by the signal analysis unit 62 (FIG. 2) from the frequency signal FS output by the sensor 50.

At step S20, the above-described verification processing by the verification unit 64 is executed. The verification unit 64 acquires the feature value of the detection data DD. Then, the verification unit 64 calculates the distance D from the node ND closest to the feature value of the detection data DD, and compares the distance D with the abnormality threshold value (FIG. 4). In the exemplary embodiment, as the abnormality threshold value, a second abnormality threshold value Thb is also set in addition to the first abnormality threshold value Tha described above. The first abnormality threshold value Tha is larger than the second abnormality threshold value Thb. The verification unit 64 classifies the detection data DD as follows by using the two abnormality threshold values Tha and Thb.

Figure 6:
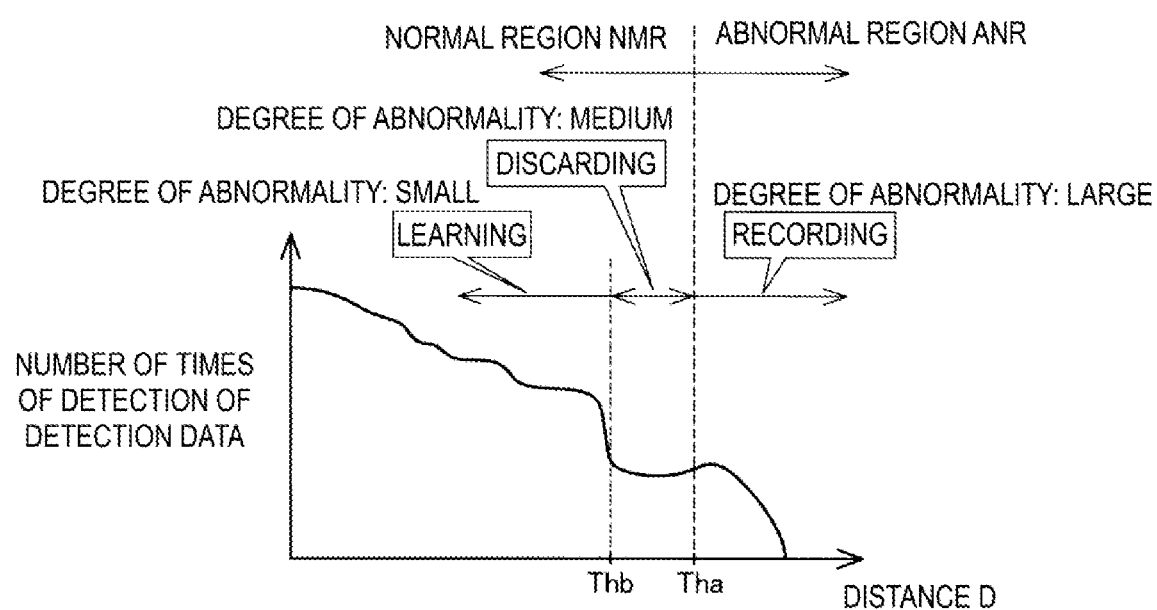
FIG. 6 is an explanatory diagram illustrating an example of distribution for each distance of the number of times of detection of detection data.

With reference to FIG. 6, processing of classifying the detection data DD by using the two abnormality threshold values Tha and Thb will be described. FIG. 6 illustrates a graph illustrating an example of distribution for each distance D of the number of times of detection of the detection data DD detected during a certain period of time.

In the verification processing, as described above, the detection data DD indicating the distance D equal to or less than the first abnormality threshold value Tha is determined as belonging to the normal region NMR. Then, of the detection data DD belonging to the normal region NMR, the detection data DD indicating the distance D smaller than the second abnormality threshold value Thb is classified as a "small" degree of abnormality, and the detection data DD indicating the distance D equal to or less than the first abnormality threshold value Tha and larger than the second abnormality threshold value Thb is classified as a "medium" degree of abnormality. The detection data DD indicating the distance D larger than the first abnormality threshold value Tha is determined as belonging to the abnormal region ANR and classified as a "large" degree of abnormality.

Of the detection data DD determined as belonging to the normal region NMR, the detection data DD indicating the "small" degree of abnormality is output to the learning unit 66 (FIG. 2) as the learning data LD and used for the learning of the self-organizing map MP. The detection data DD indicating the "medium" degree of abnormality is discarded at step S35 (FIG. 5) to be described later. The detection data DD determined as belonging to the abnormal region ANR and indicating the "large" degree of abnormality is output to the management unit 68 (FIG. 2) as the recorded data RD. At this time, together with the recorded data RD, the distance D calculated with respect to each piece of the recorded data RD is also output to the management unit 68.

At step S30 (FIG. 5), the learning unit 66 performs the learning of the self-organizing map MP by using the learning data LD received from the verification unit 64. The learning unit 66 updates the weight vector of the node ND present in the node information NI to make the distance D determined from the detection data DD concerned smaller.

At step S35, the detection data DD determined as belonging to the normal region NMR is discarded. Specifically, the learning unit 66 discards the learning data LD having been already used for the learning of the self-organizing map MP, and the verification unit 64 discards the detection data DD classified as the "medium" degree of abnormality and having not been used for the learning of the self-organizing map MP. Accordingly, as a result of repeatedly performing the processing in which the detection data DD indicating the "medium" degree of abnormality is discarded without being used for the learning and only the detection data DD indicating the "small" degree of abnormality is used for the learning of the self-organizing map MP, a distinction between normality and abnormality in the self-organizing map MP becomes clearer.

At step S40, the management unit 68 stores, in the storage unit 60, the recorded data RD received from the verification unit 64 and indicating the "large" degree of abnormality.

Figure 7:
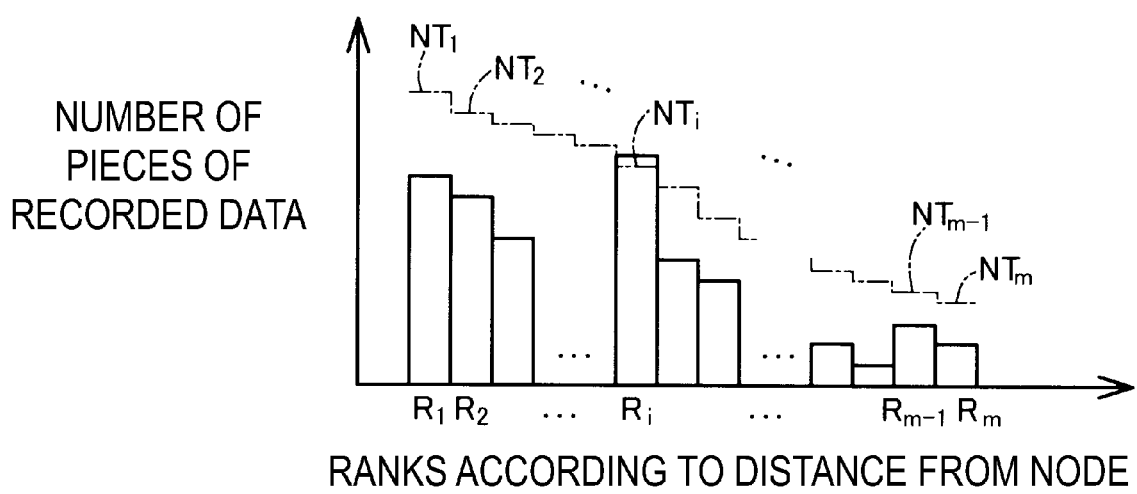
FIG. 7 is an explanatory diagram explaining a method for managing recorded data by a management unit.

With reference to FIG. 7, a method for managing the recorded data RD by the management unit 68 will be described. The management unit 68 stores each piece of the recorded data RD for each of a plurality of ranks $R_m$ (m is any natural number) set in advance in accordance with the distance D. In First Exemplary Embodiment, the ranks $R_m$ are set to divide the distance D at an equal interval. The management unit 68 counts the number of pieces of the recorded data RD for each of the ranks $R_m$ stored in the storage unit 60. It can be understood that the management unit 68 manages each piece of the recorded data RD by using a histogram as illustrated in the drawing.

The abnormality warning system 10 performs notification of the abnormality of the target object when the number of pieces of the recorded data RD stored in the storage unit 60 reaches a predetermined number. In First Exemplary Embodiment, the abnormality warning system 10 performs the notification of the abnormality of the target object when the number of pieces of the recorded data RD counted for each of the ranks $R_m$ reaches the predetermined number. The management unit 68 sets a notification threshold value $NT_m$ corresponding to the predetermined number, for each of the ranks $R_m$. When the number of pieces of the recorded data RD in at least one rank $R_i$ (i is any natural number equal to or less than m) reaches a notification threshold value $NT_i$ of the rank $R_i$ concerned, the management unit 68 warns the possibility of the abnormality occurrence in the target object via the notification unit 56 of the interface unit 55 (step S60 in FIG. 5). Together with the warning, the management unit 68 notifies an operator with a message prompting inspection of the target object.

At step S70, the management unit 68 receives via the operation unit 58 of the interface unit 55 evaluation by an operator with respect to the warning of the abnormality notified. In the exemplary embodiment, the following three levels of evaluation are received.

(i) The abnormality of which a warning is issued is outside the permissible range to cause a problem in driving of the printing apparatus 100, and the warning is appropriate.

(ii) The abnormality of which a warning is issued is within the permissible range not to cause any problem in driving of the printing apparatus 100, and the warning is inappropriate.

(iii) At present, a cause of the abnormality is unknown, and it is unclear whether the warning is appropriate or not (undetermined).

This evaluation is performed, for example, by causing the display unit constituting the notification unit 56 to display evaluation items (i) to (iii) described above, and by receiving via the operation unit 58 the selection by a user from the evaluation items concerned. At step S80, the management unit 68 executes update processing of the recorded data RD of processing the recorded data RD stored in the storage unit 60 in accordance with the evaluation results input by an operator. Next, the update processing of the recorded data RD will be described. As a result of the above-described steps, the abnormality detection processing by the abnormality detection unit 15 is completed.

Figure 8:
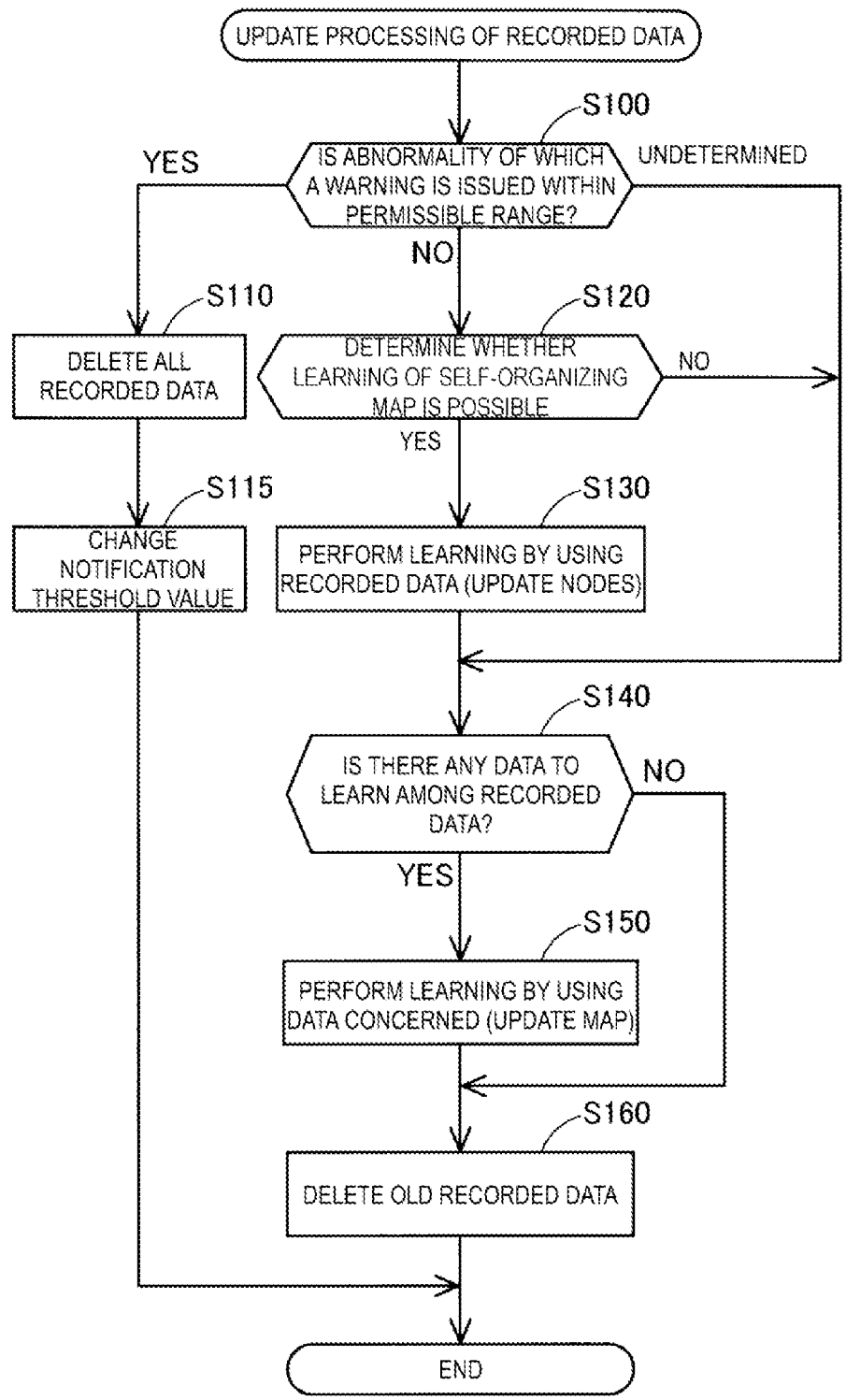
FIG. 8 is an explanatory diagram illustrating a flow of update processing of the recorded data by the management unit.

FIG. 8 is an explanatory diagram illustrating a flow of the update processing of the recorded data RD by the management unit 68. When an operator has evaluated that the warning is appropriate (YES at step S100), the management unit 68 determines that the warning has been issued appropriately on the basis of the self-organizing map MP appropriately learned, and deletes all the recorded data RD in the storage unit 60 (step S110). As a result, an amount of data stored in the storage unit 60 can be reduced. In addition, it is possible to suppress influence of a history of the recorded data RD old on the determination of the warning.

At step S115, the management unit 68 lowers the notification threshold value $NT_i$ in the rank $R_i$ in which the warning of the abnormality has been issued. As a result, the warning of the abnormality occurrence is early executed with respect to the rank $R_i$ in which the warning has been already issued.

When the operator has evaluated that the warning is not appropriate (NO at step S100), the management unit 68 causes the self-organizing map MP to learn to make it difficult to determine in future the recorded data RD having triggered the warning as the detection data DD indicating a state different from the normal state. First, the management unit 68 determines whether the learning of the self-organizing map MP for suppressing the warning indicating an abnormality falling within the permissible range is possible (step S120).

Here, the case where the learning of the self-organizing map MP is possible refers to a case where the recorded data RD that the self-organizing map MP is to learn can be identified. Namely, the case where the learning of the self-organizing map MP is possible is a case where the recorded data RD having a tendency significantly different from the other recorded data RD and having a possibility of triggering of the warning can be identified. For example, the case where the learning of the self-organizing map MP is possible may be a case where the recorded data RD having the number of times of recording significantly larger than the other recorded data RD, when the number of times of recording of the recorded data RD is compared for each distance D. In contrast, the case where the learning of the self-organizing map MP is not possible refers to a case where the recorded data RD that the self-organizing map MP is to learn cannot be identified. For example, the case where the learning of the self-organizing map MP is not possible is a case where a difference in the number of times of recording of the recorded data RD for each distance D is within a predetermined range, and there is no significant difference among the recorded data RD for each distance D.

Figure 9:
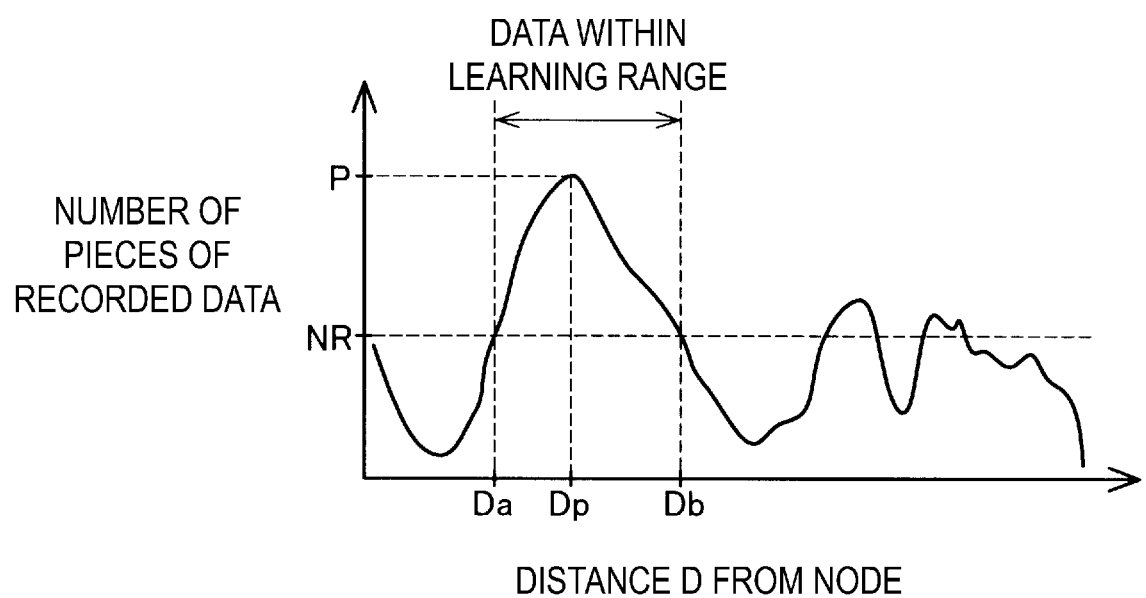
FIG. 9 is an explanatory diagram illustrating an example of a method for identifying the recorded data used for learning of the self-organizing map.

FIG. 9 is an explanatory diagram illustrating an example of a method for determining the possibility of the learning of the self-organizing map MP and identifying the recorded data RD used for the learning of the self-organizing map MP. When the recorded data RD having the number of times of recording exceeding a predetermined peak threshold value P is detected in the distribution for each distance D of the recorded data RD, the management unit 68 determines that this case is a case where the learning of the self-organizing map MP is possible (an arrow indicating "YES" at step S120 in FIG. 8). The management unit 68 identifies the recorded data RD of a distance Dp having the number of times of recording exceeding the peak threshold value P, as the recorded data RD having triggered the warning this time.

Further, the management unit 68 identifies a group of the recorded data RD having the number of times of recording exceeding, before and after the distance Dp of the recorded data RD concerned, the number of times of recording NR set in advance (a group of the recorded data RD of distances Da to Dp) as data being within a learning range. For example, the number of times of recording NR may be set to a value half of a maximum value of the recorded data RD that can be recorded in the storage unit 60. The learning unit 66 reads the recorded data RD present in the group from the storage unit 60, performs the learning of the self-organizing map MP, and updates the node information NI (step S130 in FIG. 8).

Accordingly, in the abnormality warning system 10, the learning of the self-organizing map MP is performed by using the recorded data RD having triggered the warning, but determined by an operator as being within the permissible range. Then, since the weight vector of the node ND is updated as a result of the learning using the recorded data RD determined as belonging to the abnormal region ANR, repetition of the warning is reduced. Note that, at step S130, the management unit 68 deletes the recorded data RD having been already used for the learning from the storage unit 60.

At step S140 (FIG. 8), the verification unit 64 performs re-verification processing using the current self-organizing map MP on the recorded data RD currently stored in the storage unit 60. Step S140 is executed when it is determined at step S120 that the learning of the self-organizing map MP is not possible (an arrow indicating "NO"), or when the learning of the self-organizing map MP is completed at step S130.

The verification unit 64 verifies all the recorded data RD currently remaining in the storage unit 60 by the same method as described at step S20 in FIG. 5, and determines whether the recorded data RD includes data that can be used for the learning of the current self-organizing map MP. When the recorded data RD determined as being able to be used for the learning is extracted, the verification unit 64 outputs the recorded data RD concerned to the learning unit 66 as the learning data LD. The learning unit 66 performs the learning of the self-organizing map MP using the learning data LD (step S150).

At step S160, the management unit 68 deletes all the recorded data RD remaining in the storage unit 60. As a result, an amount of data stored in the storage unit 60 can be reduced. In addition, it is possible to suppress influence of a history of the recorded data RD old on the determination of the warning in the abnormality detection processing (step S50 in FIG. 5). As a result of the above-described steps, the update processing of the recorded data RD is completed.

Figure 10:
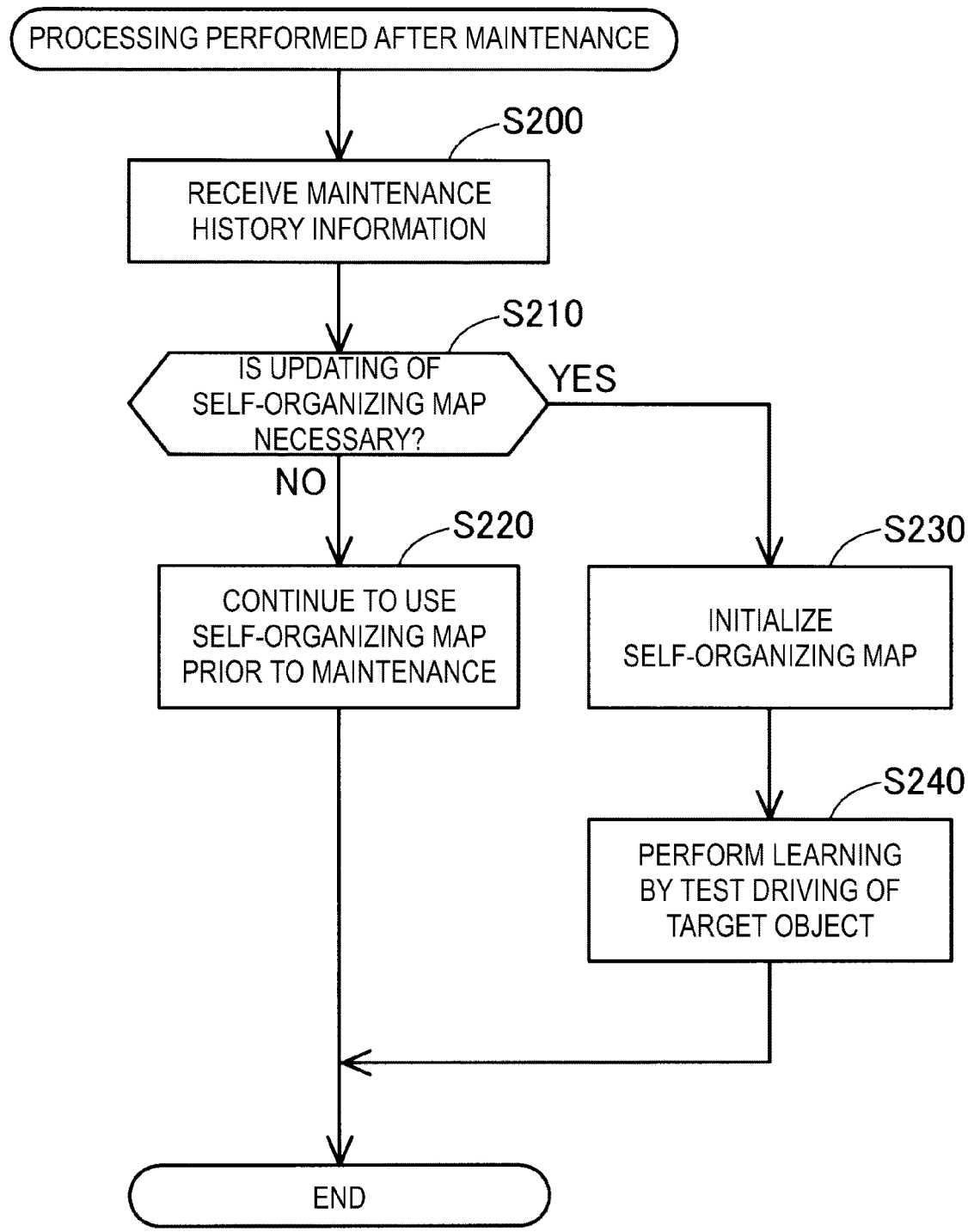
FIG. 10 is an explanatory diagram illustrating a flow of processing performed after maintenance.

FIG. 10 is an explanatory diagram illustrating a flow of processing executed after maintenance of the nozzles 31. While the printing apparatus 100 is being driven, the management unit 68 (FIG. 2) of the abnormality detection unit 15 receives at all times an input indicating that maintenance work of the nozzles 31 has been executed (step S200) via the operation unit 58 from an operator. When information regarding a history of maintenance implemented on the target object is input by an operator, the abnormality detection unit 15 inquires of the operator via the notification unit 56 necessity of updating the self-organizing map MP (step S210).

The case where the updating of the self-organizing map MP is necessary refers to, for example, a case where maintenance work involving parts replacement is performed and the driving state of the target object has significantly changed, and a case where recovery of a state at the time of factory shipment is performed. In addition, the case where the updating of the self-organizing map MP is not necessary refers to, for example, a case where contents of the maintenance are merely minor adjustment, cleaning of parts, and the like, and the driving state of the target object has not significantly changed before and after the maintenance.

When the operator has responded via the operation unit that the updating of the self-organizing map MP is not necessary (an arrow indicating NO at step S210), the management unit 68 causes the verification unit 64 to continue to use the self-organizing map MP having a state prior to the implementation of the maintenance. The management unit 68 causes the verification unit 64 to read the node information NI recorded before the maintenance and to construct the self-organizing map MP having the state prior to the implementation of the maintenance. As a result, a temporary drop in detection accuracy of the abnormality caused by restarting the learning of the self-organizing map MP from the initial state after the maintenance is suppressed.

When the operator has responded via the operation unit 58 that the updating of the self-organizing map MP is necessary (an arrow indicating YES at step S210), the management unit 68 causes the verification unit 64 to initialize the current self-organizing map MP (step S230). The management unit 68 discards the current node information NI in the storage unit 60 and causes the verification unit 64 to re-construct the self-organizing map MP by using the initial node information NIs. As a result, a temporary drop in detection accuracy of the abnormality caused by the self-organizing map MP indicating the state of the target object prior to the maintenance and not suitable for the state of the target object obtained after the maintenance is suppressed.

Subsequently, at step S240, the abnormality detection unit 15 causes the printing head 30 to execute discharging of the ink for a test purpose, and executes the learning of the self-organizing map MP by using the detection data DD obtained by the test and indicating the state of the target object obtained after the maintenance. As a result of the test driving being implemented, the self-organizing map MP having a more appropriate state and suitable for the normal state of the target object obtained after the maintenance can be obtained within a shorter period of time and thus, efficiency is achieved. Note that the self-organizing map MP obtained as a result of the test driving being implemented may be stored in the storage unit 60 as the initial node information NIs.

As described above, according to the printing apparatus 100 of the exemplary embodiment, the warning of the discharge abnormality of ink from the nozzles 31 is issued more appropriately by the abnormality warning system 10 using the self-organizing map MP. In addition, according to the abnormality warning system 10 of the exemplary embodiment, since the normal state of the target object is constantly updated by the learning of the self-organizing map MP (step S30 in FIG. 5), an appropriate warning of the abnormality reflecting a change over time in the permissible range in the target object and the like becomes possible. In addition, the abnormality warning system 10 of the exemplary embodiment temporarily accumulates as the recorded data RD the detection data DD determined as a state different from the normal state, and when the detection data DD determined as a state different from the normal state is repeatedly acquired, the warning of the possibility of the abnormality occurrence in the target object is issued to an operator (steps S40 to S60 in FIG. 5). Therefore, the warning of the abnormality in the target object triggered by the detection data DD generated by an event having simply occurred by accident is suppressed.

In the abnormality warning system 10 of the exemplary embodiment, the self-organizing map MP based on the initial node information NIs (FIG. 2) created by using the detection data DD obtained from the target object confirmed as being in the normal state is generated in advance at the time of factory shipment. Thus, a high abnormality detection accuracy is realized immediately after starting of the learning of the self-organizing map MP.

In the abnormality warning system 10 of the exemplary embodiment, the detection data indicating the distance D from the closest node ND smaller than the first abnormality threshold value Tha and larger than the second abnormality threshold value Thb is discarded (steps S20 to S35 in FIG. 5, FIG. 6). Thus, the learning of the self-organizing map MP is performed to make a boundary clearly distinguishable between the detection data DD to be reflected on the self-organizing map MP, and the detection data DD stored in the storage unit 60 and indicating a state different from the normal state. As a result, with respect to the detection data DD, the distinction between the abnormality and the normal state can be clearly made.

In the abnormality warning system 10 of the exemplary embodiment, the input of the evaluation relating to whether the abnormality notified is within the permissible range is received from an operator (step S70 in FIG. 5). Then, when the evaluation of the operator is evaluation indicating that the abnormality is outside the permissible range, the recorded data RD is deleted from the storage unit 60 (step S110 in FIG. 8). As a result, since the discard of the recorded data RD without being subjected to the evaluation of the operator is suppressed, the determination of the operator can be reflected in the warning of the abnormality.

In the abnormality warning system 10 of the exemplary embodiment, the recorded data RD is stored in the storage unit 60 for each of the ranks $R_m$ set in accordance with the distance D (FIG. 7). Then, when the number of pieces of the recorded data RD becomes equal to or greater than the notification threshold value $NT_m$ in at least one of the ranks $R_m$, the notification is executed (steps S50 and S60 in FIG. 5). Thus, more appropriate notification of the warning according to the frequency of the abnormality occurrence in the recorded data RD for each distance D is made possible.

In the abnormality warning system 10 of the exemplary embodiment, when the evaluation relating to the warning of the abnormality and indicating that the abnormality is within the permissible range and the warning is not appropriate is received from an operator, the learning of the self-organizing map MP is performed by using the recorded data RD having triggered the notification of the abnormality (step S130 in FIG. 8). Since the learning of the self-organizing map MP is performed by using the detection data DD belonging to the permissible range determined by an operator, repeated warning the abnormality is suppressed.

In the abnormality warning system 10 of the exemplary embodiment, the detection data DD collectively indicating the states of the plurality of nozzles 31 is acquired by the single sensor 50. Thus, the abnormality regarding the plurality of target objects is detected efficiently. In particular, in the exemplary embodiment, since ink discharge sound at the plurality of nozzles 31 different in a distance from the sensor 50 can be detected collectively by the single sensor 50, an increase in size of the printing head 30, complication of a configuration of the printing apparatus 100, and an increase in manufacturing costs of the printing head 30 and the printing apparatus 100 can be suppressed more effectively.

In the abnormality warning system 10 of the exemplary embodiment, the node information NI for constructing the self-organizing map MP is stored in the storage unit 60 in a non-volatile manner, and it is understood that the self-organizing map MP is stored in the storage unit 60 in a non-volatile manner. As a result, even when power supply to the abnormality warning system 10 is cut off, the self-organizing map MP is prevented from being erased, and the self-organizing map MP can be used continuously for a long period of time.

Additionally, according to the abnormality warning system 10 of the exemplary embodiment, the abnormality warning method realized in the abnormality warning system 10, and the printing apparatus 100 provided with the abnormality warning system 10, various actions and effects described in the exemplary embodiment can be achieved.

2. Other Exemplary Embodiments

Various configurations described in each of the above-described exemplary embodiments can be modified as follows, for example. Any of modifications described below is regarded as an example of an aspect for implementing the invention.

2-1. Other Exemplary Embodiment 1

In the above-described First Exemplary Embodiment, the abnormality warning system 10 need not necessarily be mounted on the printing apparatus 100. The abnormality warning system 10 may be mounted on an apparatus other than the printing apparatus 100 such as a liquid spray apparatus, or may be configured as an apparatus separate from an apparatus provided with the target object, for example. In addition, the target object monitored by the abnormality warning system 10 is not limited to the nozzles 31. The target object monitored by the abnormality warning system 10 may be the conveyance unit 20 or other constituent elements of the printing apparatus 100. Additionally, the target object monitored by the abnormality warning system 10 may be, for example, an object generating sound or vibration or involving other motions when the object is driven, such as an engine, an actuator, a gear, a pulley, and a roller.

2-2. Other Exemplary Embodiment 2

In the above-described First Exemplary Embodiment, the sensor 50 of the abnormality warning system 10 includes a microphone configured to detect discharge sound of the nozzles 31. In contrast, the sensor 50 may include a vibration sensor configured to detect vibration associated with discharging of ink by the nozzles 31. In addition, the sensor 50 may include an optical sensor configured to optically detect ink discharged from the nozzles 31. In this way, as long as the sensor 50 is a sensor capable of detecting the driving state of the target object, a type of the sensor 50 is not limited.

2-3. Other Exemplary Embodiment 3

In the above-described First Exemplary Embodiment, the single self-organizing map MP in which the target objects are the plurality of nozzles 31 is generated by using the detection data DD indicating ink discharge sound collectively detected by the single sensor 50. In contrast, a configuration in which the self-organizing map MP is generated for each of the nozzles 31 by using the detection data DD indicating ink discharge sound collectively detected by the sensor 50 may be adopted. According to this configuration, the detection of the abnormality can be performed more appropriately for each of the target objects. One or more of the sensors 50 may be provided with respect to the plurality of nozzles 31. The sensor 50 may be provided for each of the nozzles 31 in a one-to-one relationship. In addition, in First Exemplary Embodiment, the number of the sensors 50 provided may be two or more and less than the number of the nozzles 31.

2-4. Other Exemplary Embodiment 4

In the above-described First Exemplary Embodiment, the initial node information NIs is generated by using the detection data DD obtained from the target object confirmed as being in the normal state. In contrast, the initial node information NIs may be generated on the basis of random information generated by random number processing, for example.

2-5. Other Exemplary Embodiment 5

In the above-described First Exemplary Embodiment, the first abnormality threshold value Tha and the second abnormality threshold value Thb are used as the abnormality threshold values to classify the detection data DD by using the three types of degrees of abnormality. In contrast, the second abnormality threshold value Thb may not be set, and determination as to whether the detection data DD belongs to the normal region NMR or the abnormal region ANR may simply be made on the basis of the first abnormality threshold value Tha.

2-6. Other Exemplary Embodiment 6

In the above-described First Exemplary Embodiment, the processing of receiving the evaluation relating to the warning of the abnormality from an operator (step S70 in FIG. 5) may be omitted. In addition, the update processing of the recorded data RD in accordance with the evaluation by an operator (step S80 in FIG. 5, FIG. 8) may be omitted. The recorded data RD may be deleted sequentially from the oldest data by a first-in-first-out method, for example.

2-7. Other Exemplary Embodiment 7

In the abnormality detection processing (FIG. 5) in the above-described First Exemplary Embodiment, after the evaluation relating to the warning of the abnormality is input from an operator (step S70), processing of changing the abnormality threshold values Tha and Thb in accordance with the evaluation by the operator may be executed. For example, when the abnormality of which the warning is issued is evaluated as being within the permissible range, processing of raising the first abnormality threshold value Tha to expand the normal region NMR may be executed. When the abnormality of which the warning is issued is evaluated as being outside the permissible range, processing of lowering the first abnormality threshold value Tha to expand the abnormal region ANR may be executed.

2-8. Other Exemplary Embodiment 8

In the above-described First Exemplary Embodiment, the recorded data RD is recorded in the storage unit 60 for each of the ranks $R_m$. In contrast, the recorded data RD may not be recorded for each of the ranks $R_m$, and may be recorded for each distance D, for example. In addition, the recorded data RD may also be recorded in association with the closest node ND, and for each of the nodes ND. When the recorded data RD is recorded for each of the nodes ND, a configuration in which the warning of the abnormality of the target object is issued when the number of pieces of the recorded data RD for at least one of the nodes ND has reached or exceeded a notification threshold value set in advance for each of the nodes ND may be adopted. According to the configuration in which the warning of the abnormality of the target object is issued for each of the nodes ND, an operator can recognize a sign of the abnormality for each of the nodes ND. As a result, when an operator can understand a type of the abnormality associated with each of the nodes ND, the operator can identify the type of the abnormality on the basis of the warning issued for each of the nodes ND.

2-9. Other Exemplary Embodiment 9

In the above-described First Exemplary Embodiment, the node information NI is stored in the storage unit 60 in a non-volatile manner. In contrast, the node information NI may not be stored in a non-volatile manner. The processing performed after the maintenance is implemented on the nozzles 31 (FIG. 10) as described in the above-described First Exemplary Embodiment may be omitted.

2-10. Other Exemplary Embodiment 10

In the processing performed after the maintenance (FIG. 10) in the above-described First Exemplary Embodiment, the information regarding the history of the maintenance implemented on the target object is input into the management unit 68 by an operator (step S200). In contrast, the information regarding the history of the maintenance implemented on the target object may be input into the management unit 68 by a sensor capable of sensing the maintenance on the target object. For example, when a sensor configured to sense a conduction state between the target object and a driving power source senses that the conduction state has been cut off, the information regarding the history of the maintenance implemented on the target object may be input into the management unit 68. Similarly, at step S210 of the processing performed after the maintenance, the management unit 68 may use output signals of various sensors to determine whether contents of the maintenance requires the updating of the self-organizing map MP.

2-11. Other Exemplary Embodiment 11

In the above-described exemplary embodiments, some or all of the functions and processing realized by software may be realized by hardware. In addition, some or all of the functions and processing realized by hardware may be realized by software. As the hardware, for example, any of various circuits such as an integrated circuit, a discrete circuit, or a circuit module including a combination of the integrated circuit and the discrete circuit can be used. In each of the above-described exemplary embodiments, the control unit 11 may include such a circuit. In addition, the control unit 11 may include a plurality of processors.

The invention is not limited to the exemplary embodiments, the examples, and the modifications described above, and can be realized in various configurations without departing from the gist of the invention. For example, the technical features in the exemplary embodiments, the examples, and the modifications corresponding to the technical features in the respective aspects described in the summary of the invention may be appropriately replaced or combined to address some or all of the above-described issues or to achieve some or all of the above-described effects. In addition, not only when the technical feature is described herein as dispensable, but also when the technical feature is not described herein as indispensable, such a technical feature can be deleted as appropriate.

This application claims priority under 35 U.S.C. § 119 to Japanese Patent Application No. 2018-001811, filed Jan. 10, 2018. The entire disclosure of Japanese Patent Application No. 2018-001811 is hereby incorporated herein by reference.

What is claimed is:
1. A method for warning an abnormality of a target object, the method comprising:
  acquiring detection data indicating a state of the target object and acquiring a feature value from the detection data;
  performing learning of a self-organizing map,
  wherein the self-organizing map is prescribed by a plurality of nodes indicating a normal state of the target object,
  wherein the learning is performed by using at least a portion of the detection data indicating a distance between the feature value and a node closest to the feature value of the plurality of nodes smaller than an abnormality threshold value predefined, and
  wherein the self-organizing map is a competitive learning-type neural network;

storing the detection data indicating the distance larger than the abnormality threshold value in a storage unit as recorded data; and performing notification of the abnormality of the target object when a number of pieces of the recorded data stored in the storage unit reaches a predetermined number.

2. The method according to claim 1, further comprising generating the self-organizing map in advance by using the detection data obtained from the target object confirmed as being in the normal state.

3. The method according to claim 1, wherein
the abnormality threshold value is a first abnormality threshold value larger than a second abnormality threshold value predetermined, and
the detection data indicating the distance smaller than the first abnormality threshold value and larger than the second abnormality threshold value is discarded without being used for the learning of the self-organizing map.

4. The method according to claim 1, further comprising receiving, from an operator, an input of evaluation as to whether the abnormality notified is within a permissible range, and deleting the recorded data from the storage unit when the evaluation indicates that the abnormality is outside the permissible range.

5. The method according to claim 4, further comprising changing a value of the abnormality threshold value in accordance with the evaluation.

6. The method according to claim 1, wherein
the recorded data is stored in the storage unit for each of a plurality of ranks set in accordance with the distance, and
the notification is executed when the number of pieces of the recorded data in at least one of the plurality of ranks reaches or exceeds a notification threshold value set in advance for each of the plurality of ranks.

7. The method according to claim 6, further comprising discarding the recorded data of the at least one of the plurality of ranks having prompted the notification of the abnormality, and causing the notification threshold value of the at least one of the plurality of ranks having prompted the notification of the abnormality to be lowered as compared to the notification threshold value obtained before the notification of the abnormality.

8. The method according to claim 6, further comprising receiving, from an operator, an input of evaluation as to whether the abnormality notified is within a permissible range, and performing the learning of the self-organizing map by using the recorded data having triggered the notification of the abnormality, when the evaluation indicates that the abnormality is an abnormality falling within the permissible range.

9. The method according to claim 1, wherein
the recorded data is stored in the storage unit in association with the node closest to the feature value, and
the notification is executed when the number of pieces of the recorded data with respect to at least one of the plurality of nodes reaches or exceeds a notification threshold value set in advance for each of the plurality of nodes.

10. The method according to claim 1, wherein
the detection data indicating states of a plurality of the target objects is acquired by a single sensor.

11. The method according to claim 1, wherein
the self-organizing map is generated with respect to each of a plurality of the target objects.

12. The method according to claim 1, wherein
the self-organizing map is constructed by using information of the plurality of nodes stored in the storage unit in a non-volatile manner.

13. The method according to claim 12, further comprising reading out the information of the plurality of nodes from the storage unit after information regarding a history of maintenance implemented on the target object is input, and constructing the self-organizing map of a state prior to the implementation of the maintenance.

14. The method according to claim 12, further comprising initializing the information of the plurality of nodes in the storage unit and initializing the self-organizing map after information regarding a history of maintenance implemented on the target object is input.

15. The method according to claim 14, further comprising performing the learning of the self-organizing map by using the detection data indicating a state of the target object obtained after the implementation of the maintenance and after the self-organizing map is initialized.

16. An abnormality warning system configured to detect an abnormality of a target object, the abnormality warning system comprising:
a sensor configured to output detection data indicating a current state of the target object;
a storage unit configured to store information relating to a plurality of nodes prescribing a self-organizing map and indicating a normal state of the target object, and recorded data;
a notification unit configured to perform notification of an abnormality of the target object; and
a control unit configured to detect the abnormality of the target object and cause the notification unit to perform the notification of the abnormality by using the self-organizing map constructed by using the information relating to the plurality of nodes, and the detection data,
wherein
the control unit
performs learning of the self-organizing map by using a distance between a feature value acquired from the detection data and a node closest to the feature value of the plurality of nodes and, when the distance is smaller than an abnormality threshold value predefined, wherein the self-organizing map is a competitive learning-type neural network,
stores the detection data in the storage unit as the recorded data when the distance is larger than the abnormality threshold value, and
causes the notification unit to perform the notification of the abnormality when a number of pieces of the recorded data stored in the storage unit reaches a predetermined number.

* * * * *